March 11, 1930. A. D. GALLAGHER 1,749,974
CULTIVATOR
Original Filed July 23, 1924  2 Sheets-Sheet 2
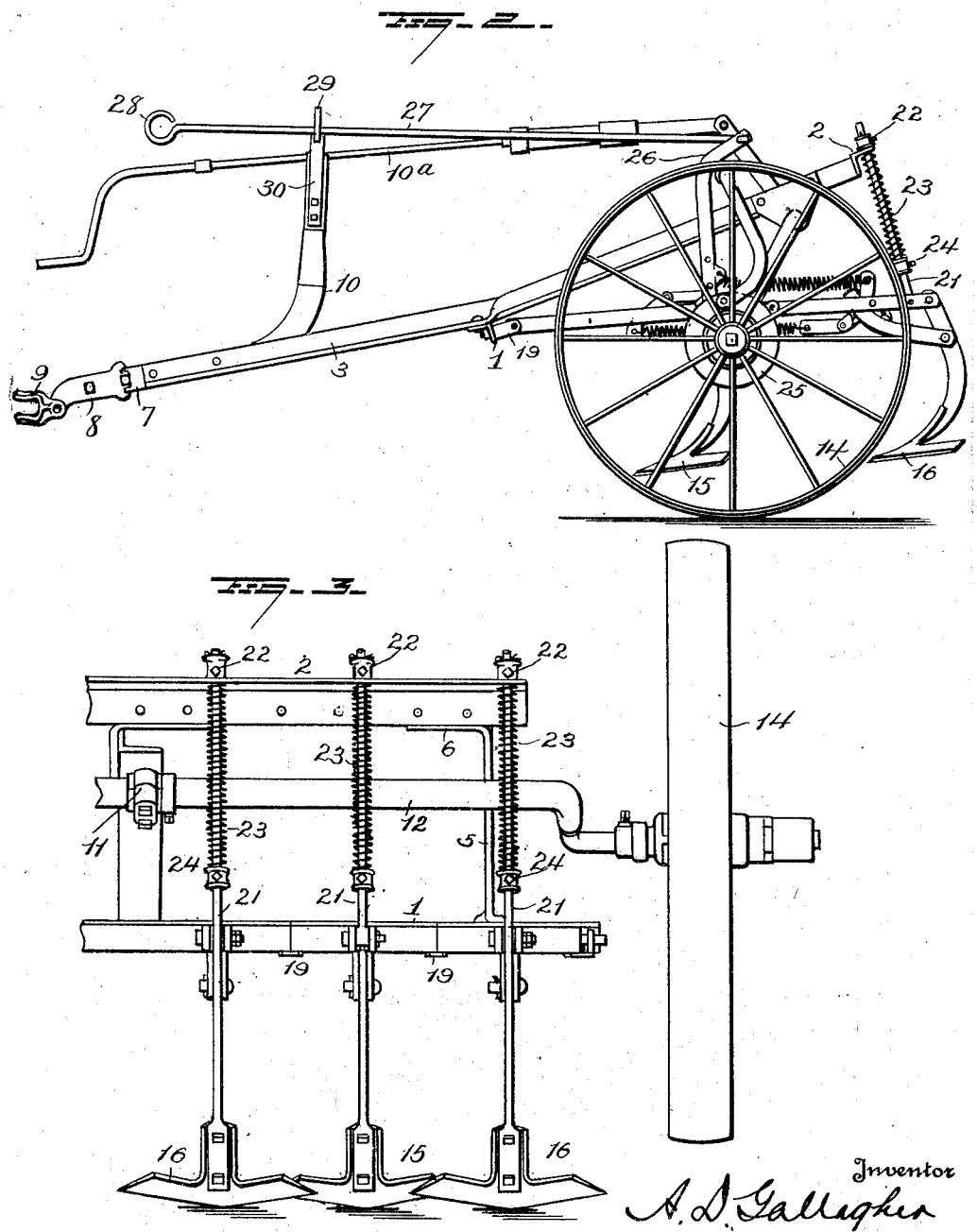

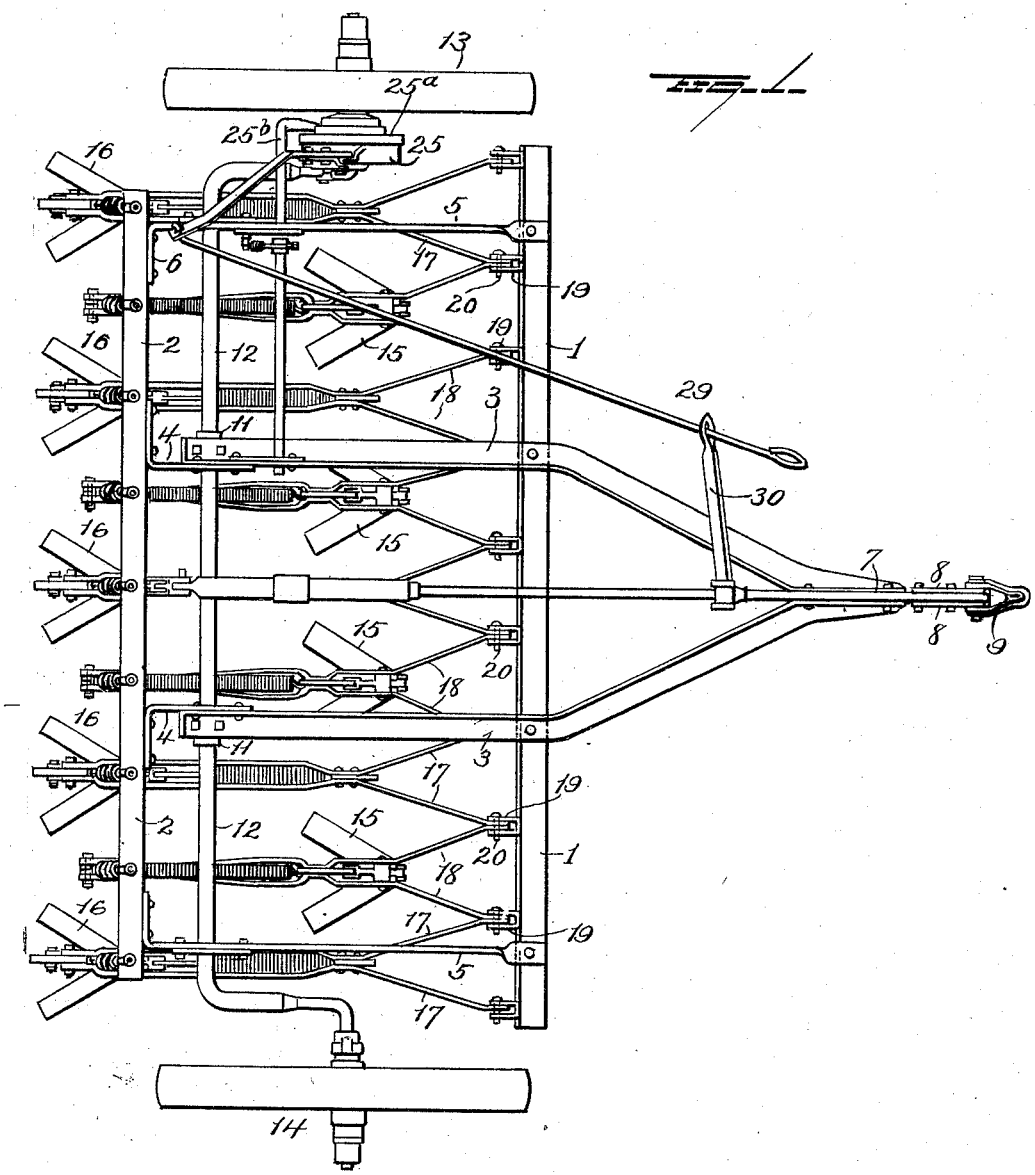

Patented Mar. 11, 1930

1,749,974

UNITED STATES PATENT OFFICE

ARTHUR D. GALLAGHER, OF SOUTH BEND, INDIANA, ASSIGNOR, BY MESNE ASSIGNMENTS, TO OLIVER FARM EQUIPMENT COMPANY, A CORPORATION OF DELAWARE

CULTIVATOR

Original application filed July 23, 1924, Serial No. 727,743. Divided and this application filed March 22, 1927. Serial No. 174,871.

This invention relates to improvements in cultivators, and particularly to those of the wheeled type, this application being a division of appilcation for patent filed by me on the 23rd day of July, 1924, and designated by Serial No. 727,743.

One object of the invention is to improve and simplify the construction of wheeled cultivators.

A further object is to provide a simple unitary structure adapted for the reception of the various movable parts of the cultivator.

With these and other objects in view, the invention consists in certain novel features of construction and combinations of parts as hereinafter set forth and pointed out in the claims.

In the accompanying drawings; Figure 1 is a plan view of a cultivator embodying my improvements;

Figure 2 is a view in side elevation, and

Figure 3 is a rear view.

The cultivator embodies a unitary frame in which front and rear horizontal beams 1—2 are employed. To the front beam 1 at respective sides of the center thereof, longitudinal beams 3—3 are secured and the rear ends of these longitudinal beams are connected by means of brackets 4 with the rear beam 2 and in this manner the rear beam 2 is supported from the longitudinal beams 3. Near respective ends of the front beam 1, brace bars 5 are secured and the rear portions of these brace bars are connected with the rear horizontal beams 2 by means of brackets 6, all as clearly shown in Fig. 1. The forward portions of the longitudinal frame beams 3 approach each other, and have secured between them a draw-bar 7 which projects forwardly from the convergent forward ends of the beams 3 and has adjustably secured to it, jaws 8 with which a clevis 9 is connected for attachment to a tractor. The draw-bar extends rearwardly from its connection with the frame beams 3 and is bent upwardly to form a standard 10 to support a portion 10ª of adjusting mechanism for setting the frame at the proper height to be readily coupled to a tractor. Suitable bearings 11 are secured to the respective longitudinal beams 3 for the accommodation of a crank-axle 12 and on the spindles formed at the free ends of the cranks of said axle, carrying wheels 13—14 are loosely mounted.

The cultivator comprises forward and rear cultivator gangs 15 and 16 and each unit of each gang includes a beam portion comprising two members, the beam portions of the rear gang units being indicated at 17 and the beam portions of the front gang units being represented at 18. A plurality of U-shaped brackets 19 are suitably spaced apart and swiveled to the front horizontal frame beam 1 and in these brackets, the beam members of the front and rear gangs are pivotally connected by horizontal pivot pins 20. The rear portion of the beam of each gang unit of both gangs, has pivoted thereto the lower end of a rod 21 and the upper ends of these several rods pass through perforations in the rear frame beam 2. Collars 22 are secured to the upper end portions of the rods 21 to rest upon the beam 2 and thus the rear portions of the gang units are supported. A coiled spring 23 encircles each rod 21 and bears at its ends respectively against the frame beam 2 and a collar 24 secured to said rod,—said spring serving as presser means for the gang unit.

Both shovel gangs may be raised simultaneously when the cultivator is to be transported from place to place, by means of power-lift mechanism operable from one of the carrying wheels. In the present instance, I have shown clutch mechanism indicated at 25 for connecting the carrying wheel 13 with the frame through the medium of lifting members 25ª, 25ᵇ, so that when said wheel is locked to the lifting member 25ª, the frame and the cultivator gangs connected therewith, will be raised as will be readily understood. The clutch mechanism will be controlled by a trip-lever 26 and, in order to facilitate the manipulation of this lever by the operator, a rod 27 is connected at its rear end therewith and extends forwardly within convenient reach of the operator where it is provided with a finger-hold 28. The operating rod 27 is guided through a lop 29 at the free end of an arm or bracket 30 supported and projecting laterally from the standard portion 10 of the draw-bar 7. The lifting mechanism is known in the art and it forms no part of the present invention. Hence, it has been indicated only in a general way on the drawings.

Having fully described my invention what I claim as new and desire to secure by Letters Patent, is:—

1. In a cultivator, the combination of a frame comprising front and rear transverse members, longitudinal members fixedly connected with both transverse members between the ends thereof, a crank-axle, mountings for said axle carried by the longitudinal members near the rear ends thereof, carrying wheels in which said crank-axle is mounted beyond the ends of the transverse members, cultivator gang units pivotally connected at their forward ends to the front transverse beam, and means yieldably connecting the rear portions of the gang units with the rear transverse beam.

2. In a cultivator, the combination of a frame comprising front and rear transverse beams, longitudinal beams fixedly connected with the transverse beams between the ends thereof, a draw-bar secured to the forward portions of the longitudinal beams and having an extension rearward of such connection merging into an upwardly projecting part forming a standard and adapted to support a member of adjusting mechanism for regulating the height of the frame, gang units, means for pivotally connecting the forward ends of the gang units with the front transverse beam, and means for supporting the rear portions of the gang units on the rear horizontal beam, the rear transverse beam having perforations for the reception of supporting means for the rear portions of the gang units.

3. In a cultivator, the combination of a frame comprising front and rear transverse members, longitudinal members secured to the front transverse member at respective sides of the center thereof, brackets connecting the rear ends of said longitudinal members with the rear transverse member, a draw bar connected with the forward portions of said longitudinal bars, bearings carried by the rear portions of said longitudinal members between the transverse members, a crank axle mounted in said bearings, and carrying wheels on the ends of said crank axle beyond the ends of the transverse members.

In testimony whereof, I have signed this specification.

ARTHUR D. GALLAGHER.